US007940782B2

(12) United States Patent
Veenstra et al.

(10) Patent No.: US 7,940,782 B2
(45) Date of Patent: May 10, 2011

(54) METHOD AND SYSTEM FOR SERVICE PREPARATION OF A RESIDENTIAL NETWORK ACCESS DEVICE

(75) Inventors: Pieter Koert Veenstra, The Hague (NL); Gerardus Franciscus Johannes Wilhelmus Janssen, The Hague (NL); Johannes Angelina Hoffmans, Zoetermeer (NL)

(73) Assignee: Koninklijke KPN N.V., The Hague (NL)

( * ) Notice: Subject to any disclaimer, the term of this patent is extended or adjusted under 35 U.S.C. 154(b) by 218 days.

(21) Appl. No.: 12/445,121

(22) PCT Filed: Sep. 28, 2007

(86) PCT No.: PCT/EP2007/008466
§ 371 (c)(1),
(2), (4) Date: Apr. 10, 2009

(87) PCT Pub. No.: WO2008/043442
PCT Pub. Date: Apr. 17, 2008

(65) Prior Publication Data
US 2010/0085958 A1    Apr. 8, 2010

(30) Foreign Application Priority Data
Oct. 12, 2006   (EP) .................................... 06021448

(51) Int. Cl.
*H04L 12/56* (2006.01)
(52) U.S. Cl. ........ 370/401; 370/352; 370/400; 709/225; 709/228
(58) Field of Classification Search .................. None
See application file for complete search history.

(56) References Cited

U.S. PATENT DOCUMENTS

| 7,480,724 | B2 * | 1/2009 | Zimler et al. ................. 709/229 |
| 2002/0162029 | A1 | 10/2002 | Allen et al. |
| 2003/0093563 | A1 * | 5/2003 | Young et al. ................... 709/245 |
| 2005/0102408 | A1 * | 5/2005 | Nakamura ..................... 709/228 |
| 2005/0149748 | A1 | 7/2005 | Spry et al. |
| 2009/0138476 | A1 * | 5/2009 | Zimler et al. ...................... 707/9 |

FOREIGN PATENT DOCUMENTS
EP   1271849 A1   1/2003

OTHER PUBLICATIONS
Gasparro, D.M.,: "IP Addressing: Plan or Pay", Data Communications, McGraw Hill, vol. 25, No. 12, Sep. 1996, pp. 59-62, 64, 66.

* cited by examiner

*Primary Examiner* — Duc C Ho
(74) *Attorney, Agent, or Firm* — McDonnell Boehnen Hulbert & Berghoff LLP

(57) ABSTRACT

The invention relates to a method and system of service preparation of a residential network access device from one or more remote provisioning devices to prepare the residential network access device to receive a network service over a communications network. The method comprises the steps of receiving a line identifier indicating a physical line used by the residential network access device to connect to the communication network; transmitting an IP address from the one or more provisioning devices to the residential network access device for which the line identifier has been received, the IP address being a source address for the residential network access device, and transmitting software code portions to the IP address of the residential network access device, the software code portions being required for receiving the network service.

24 Claims, 3 Drawing Sheets

METHOD AND SYSTEM FOR SERVICE PREPARATION OF A RESIDENTIAL NETWORK ACCESS DEVICE

CROSS-REFERENCE TO RELATED APPLICATIONS

This application is a U.S. National Stage Entry of International Application No. PCT/EP2007/008466 filed on Sep. 28, 2007, which claims priority from European Application No. EP06021448.3 filed on Oct. 12, 2006, both of which are herein incorporated by reference for all purposes.

FIELD OF THE INVENTION

Generally, the invention relates to the field of providing network services to customers. More particularly, the invention relates to the field of service preparation of a residential network access device in order to enable customers to enjoy a network service after said service preparation.

BACKGROUND OF THE INVENTION

The field of telecommunications has seen a tremendous change in the last decade. One of changes relates to the emergence of IP telephony as an alternative for conventional plain old telephony systems (POTS). In IP telephony, voice information is transmitted in discrete packets over packet switched communication networks instead of claiming a circuit switched connection in a telephone network for the entire duration of the telephone conversation.

Typically, users that desire to enjoy IP telephony services while using conventional plain old telephones need a residential network access device to adapt the outbound voice information to the IP telephony network and the inbound voice information to the requirements of the conventional telephone. Such network access devices are often complicated and require considerable preparation efforts from a user before the IP telephony service can be enjoyed. An example of such a residential network access device is disclosed in US 2006/079280. Similar problems are encountered for other types of IP services.

SUMMARY OF THE INVENTION

It is an object of the invention to provide a method and system for service preparation of a residential network access device that requires only limited effort from a user before a network service, such as IP telephony or another type of IP application, can be enjoyed.

In one aspect of the invention, a method of service preparation of a residential network access device from one or more remote provisioning devices is proposed in order to prepare the residential network access device to receive a network service over a communications network. A line identifier is received indicating a physical line used by said residential network access device to connect to said communication network. An IP address is transmitted from said one or more provisioning devices to said residential network access device for which said line identifier has been received. The IP address is intended to function as a source address of the residential network access device. Furthermore, software code portions are transmitted to said IP address of said residential network access device, said software code portions being required for receiving said network service.

In another aspect of the invention, a system for service preparation of a residential network access device is proposed to receive a network service over a communications network. The system comprises one or more remote provisioning devices and a network access node device arranged for establishing a communicative connection between a plurality of said residential network access devices and said one or more remote provisioning devices. The one or more provisioning devices are arranged for receiving a line identifier from said network access node device indicating a physical line used by said residential network access device to connect to said communication network. The provisioning devices are further arranged for transmitting an IP address from said one or more provisioning devices to said residential network access device for which said line identifier has been received. The IP address is intended to function as a source address of said residential network access device. Furthermore, the one or more provisioning devices are arranged to transmit software code portions to said IP address of said residential network access device, said software code portions being required for receiving said network service.

The method and system as defined above realize a plug-and-play residential network access device. In particular, the connection of the residential network access device at a dwelling of a customer triggers the transmission of the line identifier via which the residential network access device connects to a network access node device from this network access node device to a provisioning device of the network service provider or an associated third party. This line identifier is valuable location information for customer relation services (e.g. billing) and location dependent services (e.g. routing of emergency calls to the nearest emergency centre). After having received the line identifier, an IP address is assigned to the residential network access device from a provisioning device in order to allow transmission of further functional data to the residential network access device. This functional data prepares the residential network access device for performing functions related to the desired network service. Consequently, the only action required by a customer desiring to enjoy a network service is to plug the residential network device into the appropriate connection in his dwelling after which an automatic installing and authorisation/registration process is performed requiring no further involvement of the customer. In other words, no additional actions are expected from the customer that go beyond the simple connection of a POTS telephone. In particular, it is not required that the customer has to go through a cumbersome username/password verification session on a webpage of a service provider.

An additional advantage of the proposed method and system is that the residential network access device may be an off-the-shelf device that requires no assignment of customer specific information to the residential network access device before connection to the network. The residential network access device only stores a device identifier, such as a MAC address, and is further capable of notifying the network access node device of its connection. The MAC address, however, pertains to general data not linked to any specific customer. Consequently, provisioning and changing of residential network access devices is simple.

The embodiment of the invention as defined in claims 3 and 14 is advantageous in that the MAC address bridges the gap between the physical line identifier via which the residential network access device connects to the communication network and the IP address received from the provisioning device. This is particularly advantageous in a combined Ethernet-IP communication network, as the Ethernet part of the communication network is transparent for the IP address.

The embodiments of the invention as defined in claims 4-6, 8-10 and 18-20 are advantageous in that that a communication network is provided that uses and couples information from various layers of the Internet model (layer 1: physical line identifier; layer 2: MAC address; layer 3: IP address; higher layers: customer credentials) to advantage. The embodiments may also proof to be functional for preventing nomadic use of the residential network access device. The latter function may be relevant for location dependent services.

Further aspects of the invention and embodiments as defined in the claims will be clarified with reference to the attached drawings and corresponding description. It will be understood that the invention is not in any way restricted to the embodiments disclosed in these drawings.

DETAILED DESCRIPTION OF THE DRAWINGS

Figure 1:
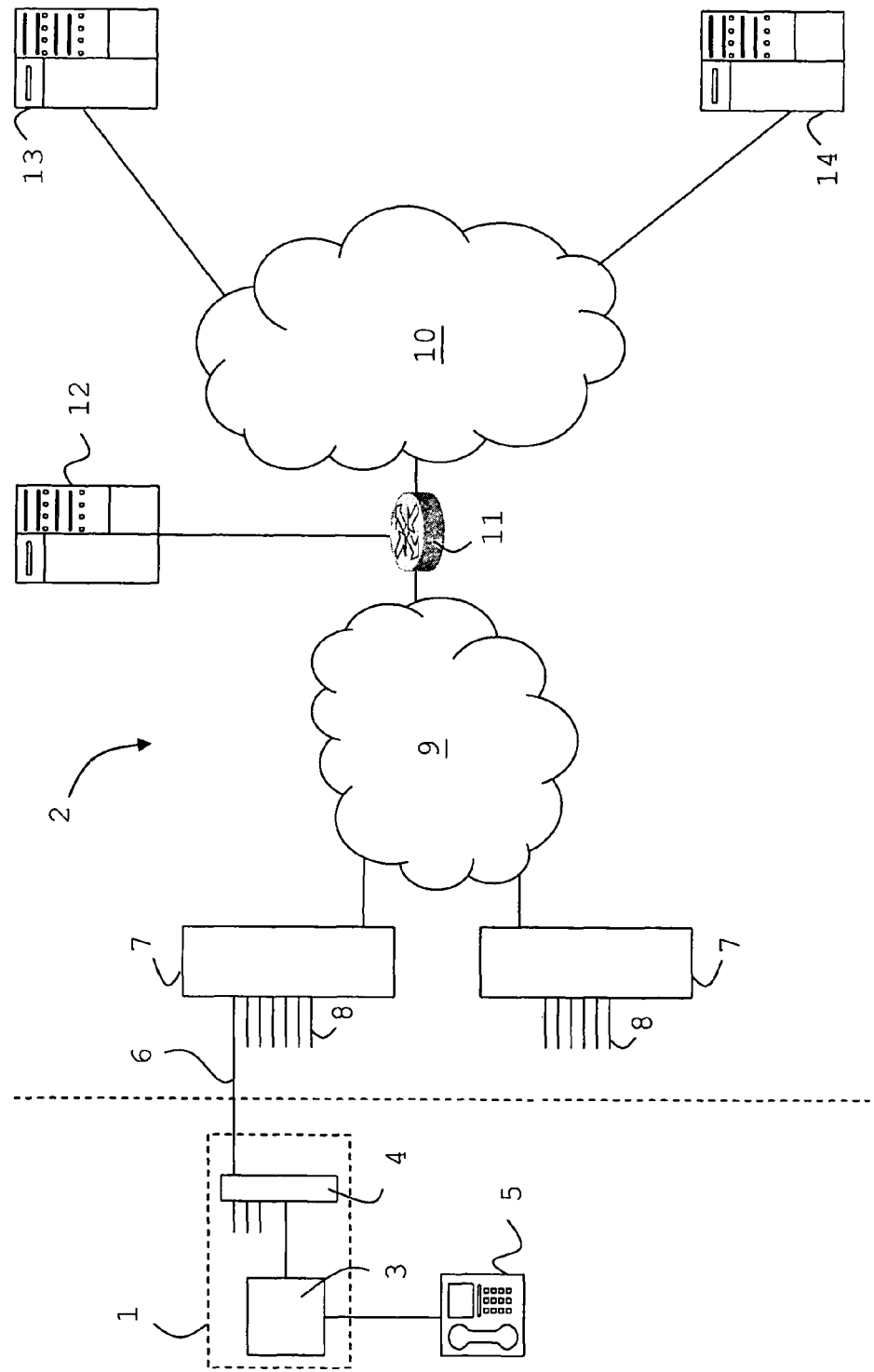
FIG. 1 depicts a schematic illustration of a communication network for providing IP telephony services to a residential network access device according to an embodiment of the invention.

In FIG. 1, a residential network access device 1, hereinafter also referred to as RNAD, is illustrated that is connected to a communication network 2. The RNAD 1 comprises an adaptor 3 and a fibre network terminator 4 and is capable of being connected to a conventional (copper) wired telephone 5.

It should be noted that the adaptor 3 and the fibre network terminator 4 are not necessarily integrated in a single device. In that case, the fibre network terminator 4 may provide RJ45 connections for connection of the adaptor 3.

It should further be appreciated that, although the presently described embodiment is limited to a fibre network connection, the described method, procedures and system are equally well applicable to copper wired connection, e.g. for xDSL connections with IP applications over Ethernet.

The adaptor 3, when properly configured according to the below described method, is capable of providing an IP telephony network service (VoIP) for the conventional telephone 5 over the communication network 2.

The fibre network terminator 4 provides Ethernet access for the customer of the RNAD 1. In the present embodiment, the functionality of the fibre network terminator 4 is limited to providing access on Ethernet level via one or more virtual local area networks (VLANs). The fibre network terminator 4 comprises further connections for receiving other services over the communication network that will not be described further.

The RNAD 1 is communicatively connected by a fibre 6 to the communication network 2 by a fibre access node device 7. The fibre access node device 7 comprises a fibre access card with inputs 8 for further fibres of further RNADs (not shown).

The fibre access node device 7 may be capable of receiving fibres of several hundreds of RNADs 1. In the fibre access node, the VLANs of the RNADs 1 are mapped on a VLAN connection to an IP edge router 11 for IP routing with provisioning devices as will be further described below.

The communication network 2 comprises an Ethernet part 9 and an IP part 10, said parts being separated by the edge router 11.

The communication network 2 further comprises a plurality of provisioning devices 12-14.

In particular, the provisioning device 12 may be a server, connected to the router 11, that is capable of assigning IP addresses to devices over the communication network 2, such as a Dynamic Host Configuration Protocol (DHCP) server. DHCP automates the assignment of IP addresses.

Provisioning device 13 is a management server taking care of the actual preparation of the RNAD 1 for receiving the IP telephony service over the communication network 2.

Provisioning device 14 is an IP multimedia subsystem (IMS) providing the IP telephony service by voice emulation after preparation of the RNAD 1 for receiving this service. IMS uses open standard IP protocols, defined by the IEFT, and is capable of providing IP based services, such as VoIP. The IMS 14 employs a telephony application server (not shown individually) that uses the Session Initiation Protocol (SIP) for call session control of the RNAD 1. SIP is an application layer signaling peer-to-peer protocol for creating, modifying and terminating sessions, such as IP telephone calls. SIP is specified in RFC 3261 of the IEFT SIP Working Group. It should be appreciated, however, that other signaling protocols, such as H.248, may be used.

It will be evident for the skilled person that the system illustrated in FIG. 1 may contain further devices or systems for executing further functions, including, but not limited to, couplings for the IMS 14 to an existing conventional PSTN network (bridge-to-voice), systems for billing, maintenance, service etc. and a Session Border Controller (SBC). A SBC is a device used in some IP telephony networks for exerting control over the signaling and media streams involved in setting up, conducting, and tearing down calls. SBCs are put into the signaling and/or media path between a calling and a called party and may split a SIP signalling stream and a RTP media stream.

Figure 2:
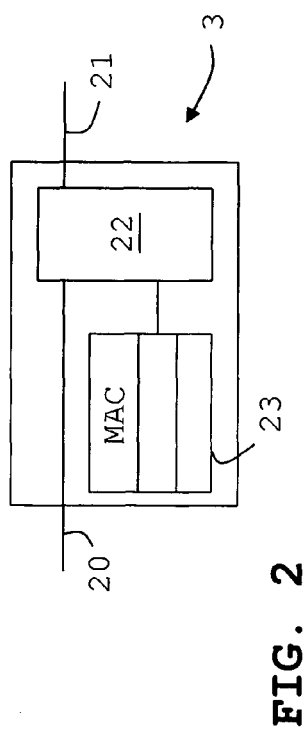
FIG. 2 displays a schematic illustration of an adaptor of a residential network access device.

A customer desiring to receive IP telephony network services for a service provider may obtain a RNAD 1 or an adaptor 3 as shown schematically in FIG. 2. As mentioned above, the dwelling of the customer may already contain a fibre network terminator 4, such that only an adaptor 3 is required for receiving the IP telephony service. The adaptor 3 comprises a first connection 20 for the conventional telephone 5 and a second connection 21 for a fibre connection to the fibre network terminator 4 and further to the network access node device 7 over the fibre 6. The adaptor 3 further comprises a processor 22 and a memory 23. The processor 22 is arranged for converting SIP controlled IP telephony signals from the IMS 14 into conventional POTS signals for the telephone 5 by emulation of a POTS service and vice versa. The memory 23 stores a device identifier, such as a unique media access control (MAC) address. Furthermore, the memory may store further data obtained in the method described below. The memory 23 may be flash memory capable of storing configuration data. For such an RNAD 1, power failure does not directly require anew service preparation of the RNAD 1.

Figure 3:
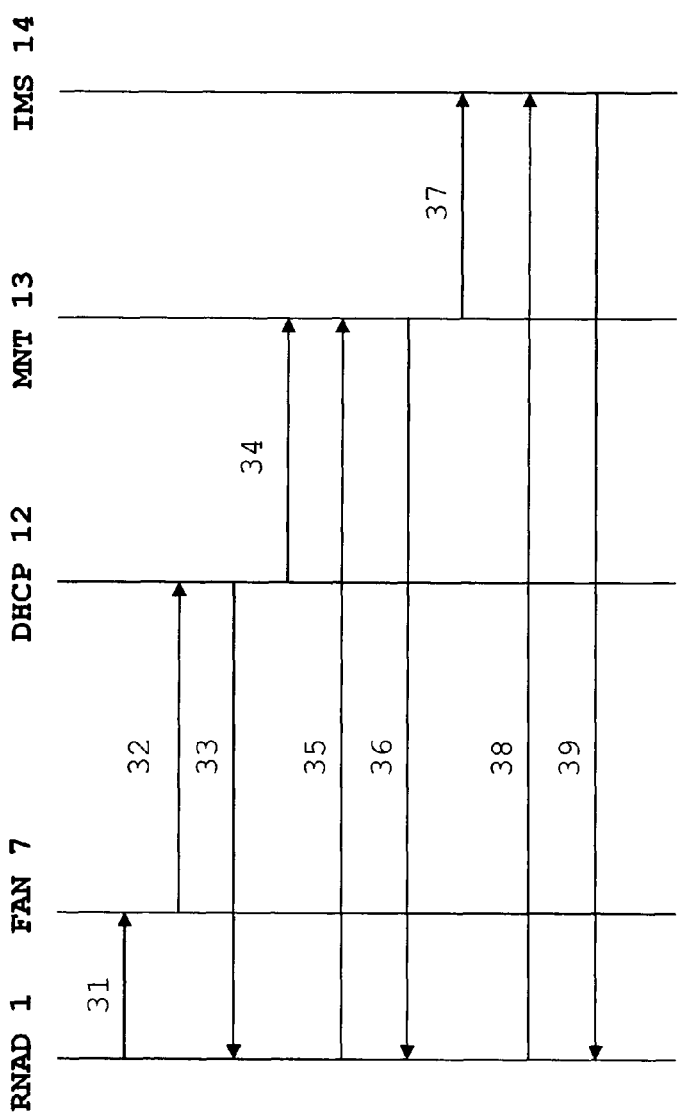
FIG. 3 shows a first example of a communication diagram for performing a method for service preparation of a residential network access device over the communication network of FIG. 1 according to an embodiment of the invention.

FIG. 3 shows a first example of a communication diagram for performing a method for service preparation of the RNAD 1 over the communication network 2 of FIG. 1 according to an embodiment of the invention.

The customer that obtained the adaptor 3 of FIG. 2 plugs second connection 21 into the appropriate connection of the fibre network terminator 4. A DHCP request, using DHCP option 82 and indicated by step 31 in FIG. 3, is then automatically triggered and transmitted to the fibre access node device 7. The request 31 may include the MAC identifier of the RNAD 1 and other credentials of the RNAD 1, such as a serial number. The request may be a broadcast request to DHCP servers 12 listening in the communication network 2 for this request in order to provide an IP address to the RNAD 1. Alternatively, the RNAD 1 may have a specific URL 12 of a DHCP server 12 stored in its memory 23.

The fibre access node device 7 analyses the line ID, indicating the port used by the physical line, i.e. the fibre 6, over which the DHCP request is received. This line ID is stored in the fibre access node device 7 together with the MAC address of the RNAD 1 via Ethernet learning. The line ID is not known at the RNAD 1 and thus is only available in the communication network 2. The MAC address is unique within the fibre access node device 7. The fibre access node device 7 then forwards the DHCP request in step 32 to the DHCP server 12.

In the embodiment of FIG. 3, the DHCP server 12 comprises a configuration table of IP addresses corresponding to the line ID's in the various fibre access node devices 7. The DHCP server 12 selects the IP address corresponding to the line ID of fibre 6 and returns the IP address in step 33 to the RNAD 1. In this step the IP source address is assigned to the RNAD 1. The router 11 intercepts and stores the MAC address of RNAD 1 in combination with the selected IP address. Furthermore, a network address URL 13 of the management server 13 is returned to the RNAD 1.

In step 34, the DHCP server 12 communicates the assigned IP source address to the management server 13. The assigned IP address may also be communicated to IMS 14 (not shown), if the IP address is used for authentication purposes in IMS 14.

In step 35, a request containing the MAC address of RNAD 1 is received at the management server 13 with URL 13 from the RNAD 1 for network service preparation. The management server 13 is already aware of the IP source address of the RNAD 1, since this address was obtained in step 34 from the DHCP server 12.

In response step 36, the management server 13 transmits voice emulation software code portions to the assigned IP address of RNAD 1 for loading in the firmware of the RNAD 1. The software code portions are required for receiving the IP telephony network service. Apart from the software for configuring the RNAD 1, the RNAD 1 receives customer specific credentials from the management server 13, including a public ID (e.g. a E.164 telephone number and a host domain), a private ID (a customer number to be used, e.g., for billing purposes) and possible other information such as a digit map. The public ID may e.g. be retrieved from a table storing relations between assigned IP source addresses for the RNAD 1 with a corresponding E.164 telephone number. Also, the RNAD 1 receives a further network address, URL 14, of the IMS server 14. In the exchange of information between the RNAD 1 and the management server 13, a trusted connection may be arranged between the RNAD 1 and the management server 13 on the basis of an encrypted identifier.

In step 37, the management server 13 communicates the assigned credentials, e.g. public ID and private ID, to the IMS 14. This step may be omitted if the management server 13 has received the IP source address of the RNAD 1 from the DHCP server 12.

In registration step 38, the RNAD 1 contacts the IMS 14 via URL 14 for the first time by transmitting the received credentials, such as the public ID and private ID, to the IMS 14. A customer specific service profile is established for the RNAD 1 with the line identifier of the fibre 6. The IMS 14 may act either on the basis of the credentials if these are trusted or also check the IP source address of the RNAD 1 if the IP source address has been provided to IMS 14.

In registration confirmation step 39, the RNAD 1 is signalled that the IP telephony service is ready. From this moment on, the customer may initiate or receive IP telephone calls with his conventional telephone 5.

In the exchange of information of steps 38 and 39, the SIP standardised challenge mechanism may provide for a secure relation between the RNAD 1 and the IMS 14.

Figure 4:
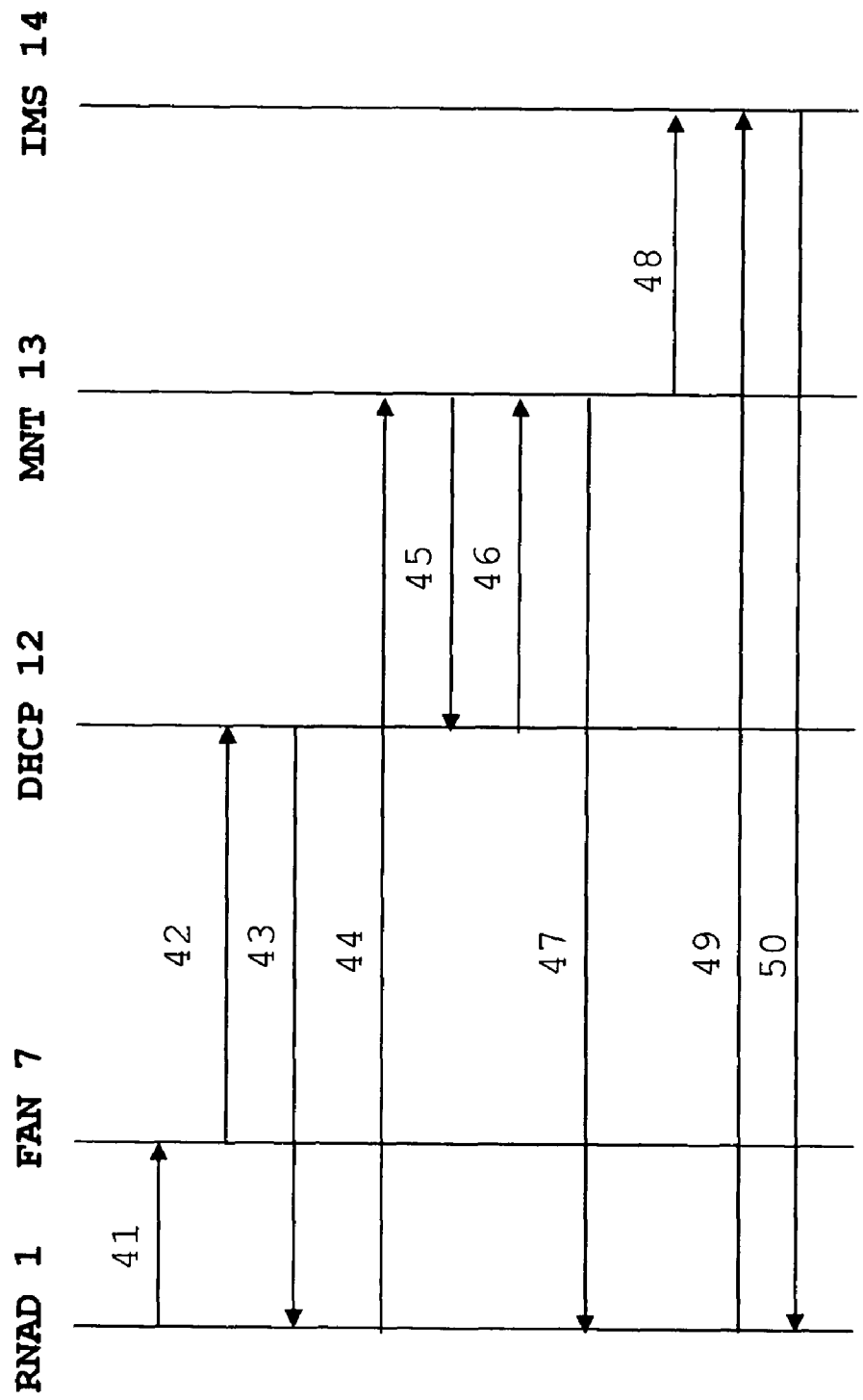
FIG. 4 shows a second example of a communication diagram for performing a method for service preparation of a residential network access device over the communication network of FIG. 1 according to an embodiment of the invention.

In the method depicted in FIG. 3, the IP source address for the RNAD 1 is a permanent address. FIG. 4 shows a second example of a communication diagram for performing a method for service preparation of the RNAD 1 over the communication network 2 of FIG. 1 according to an embodiment of the invention. In this method the DHCP server 12 dynamically assigns IP source addresses to the RNADs 1. Such an embodiment may prove to be advantageous with regard to the scalability of the system, since the DHCP server 12 no longer contains a configuration table with a reserved IP address for each line identifier.

Again, the customer that obtained the adaptor 3 of FIG. 2 simply connects the second connection 21 into the appropriate connection of his dwelling. A DHCP broadcast request, using DHCP option 82 and indicated by step 41 in FIG. 4, is then automatically triggered and transmitted to the fibre access node device 7. Again, the request 31 may include the MAC identifier of the RNAD 1 and other credentials of the RNAD 1, such as a serial number. The fibre access node device 7 analyses the line ID, indicating the port used by the physical line, i.e. the fibre 6, over which the request is received. This line ID is stored in the fibre access node 7 together with the MAC address of the RNAD 1 via Ethernet learning and is not available to the RNAD 1. The MAC address is unique within the fibre access node 7.

The fibre access node 7 forwards the DHCP request in step 42 to the DHCP server 12.

The DHCP server 12 now assigns a dynamic IP source address to the RNAD 1 in step 43 as opposed to the method as described with reference to FIG. 3. The DHCP server 12 stores the assigned IP address and the associated line ID. The router 11 intercepts and stores the MAC address of RNAD 1 in combination with the assigned IP address. Furthermore, a network address URL 13 of the management server 13 is returned in step 43.

In step 44, a request containing the MAC address of RNAD 1 is received at the management server 13 from the RNAD 1 for network service preparation.

In step 45, the management server 13 transmits a request to DHCP server 12 to check whether DHCP server 12 assigned an IP source address to RNAD 1 in step 43. In step 46, the assignment of such an IP source address is confirmed by the DHCP server 12 to the management server 13.

In response step 47, the management server 13 transmits voice emulation software code portions to the dynamically assigned IP address of RNAD 1 for loading in the firmware of the RNAD 1. The software code portions are required for receiving the IP telephony network service. Apart from the software for configuring the RNAD 1, the RNAD 1 receives customer specific credentials from the management server 13, including a public ID (e.g. a E.164 telephone number and a host domain), a private ID (a customer number to be used, e.g. for billing purposes) and possible other information such as a digit map. Also, the RNAD 1 receives a further network address, URL 14, of the IMS server 14. In the exchange of information between the RNAD 1 and the management server 13, a trusted connection may be obtained on the basis of an encrypted identifier.

In step 48, the management server 13 communicates the assigned credentials, e.g. the public ID and private ID, to the IMS 14.

In registration step 49, the RNAD 1 contacts the IMS 14 for the first time by transmitting the public ID and private ID, to the IMS 14. A customer specific service profile is established for the RNAD 1 with the line identifier of the fibre 6.

In registration confirmation step 50, the RNAD 1 is signalled that the IP telephony service is ready. From this moment on, the customer may initiate or receive IP telephone calls with his conventional telephone 5.

In the exchange of information of steps 49 and 50, the SIP standardised challenge mechanism may provide for a secure relation between the RNAD 1 and the IMS 14.

It should be appreciated from the above described methods that the action for the customer is limited to plugging the RNAD 1, or the adaptor 3 if a fibre network terminator 4 is already installed, in the appropriate connection. This action corresponds to connecting a POTS device to a conventional telecommunication network. The further preparation of the RNAD 1 to a service ready state is fully automatic.

The part of the communication network 2 ranging from the fibre access node device 7 to the provisioning devices 12-14 and further is what is referred to as a 'trusted' communication network. In other words, source identifiers of traffic, such as the line ID, are reliable in the trusted part of communication networks. On the other hand, source identifiers from the RNAD 1 can be manipulated on various levels (physically, e.g. by reconnecting fibres to other ports or on another level, e.g. spoofing of the MAC address of an RNAD 1 by another user) and is 'untrusted'.

Both the line ID of the RNAD 1 and the IP address assigned to the RNAD 1 are trusted parameters, since these are assigned by the fibre access node device 7 and the DHCP server 12, respectively, which are in the trusted part of the communication network 2. The MAC address of the RNAD 1, which may be spoofed and is, therefore, untrusted, has a bridging function between these trusted parameters.

If one desires to prevent nomadic use of the RNAD 1, i.e. use of the RNAD 1 from different physical lines that is noticed by the service provider, measures may be taken if the above described method is applied. These measures may prevent malicious use as well.

First, the fibre access node device 7 has stored a line identifier and a MAC address of the RNAD 1 in steps 31 and 41, respectively. If the fibre access node 7 receives the same MAC address over another physical line, access is denied for the latter received MAC address since it does not correspond to the line ID-MAC address pair stored in the fibre access node device 7. Retrieving the MAC address at the fibre access node device 7 may be performed by Ethernet learning. Blocking access on the basis of Ethernet learning requires frequent (5-15 minutes) transactions between the RNAD 1 and the fibre access node device 7. The number of MAC addresses for a particular VLAN may be restricted to e.g. two.

Second, the edge router 11 has stored a pair relating the assigned IP address of the RNAD 1 and the MAC address in step 33 and 43, respectively. A customer using a RNAD 1 requesting IP telephony service via another fibre access node 7 is denied access at the edge router 11 if the received source IP address and MAC address do not correspond to the pair stored at the edge router 11.

Thus, both the fibre access node 7 and IP edge router perform filtering or screening functions to avoid nomadic use of the RNAD 1.

The invention claimed is:

1. A method of service preparation of a residential network access device from one or more remote provisioning devices to prepare said residential network access device to receive a network service over a communications network, said method comprising:

receiving a line identifier indicating a physical line used by said residential network access device to connect to said communication network;

transmitting an IP address from said one or more remote provisioning devices to said residential network access device for which said line identifier has been received, said IP address being a source address for said residential network access device; and transmitting software code portions to said IP address of said residential network access device, said software code portions being required for receiving said network service, wherein said one or more remote provisioning devices include an IP address assigning server for transmitting said IP address to said residential network access device, and a management server for transmitting said software code portions to said IP address, the method further comprising exchanging said IP address between said IP address assigning server and said management server, and wherein said communication network is a fibre network.

2. The method according to claim 1, further comprising:

transmitting a further IP address to said residential network access device for which said line identifier has been received; and receiving on said further IP address a request for transmitting said software code portions.

3. The method according to claim 1, further comprising receiving a MAC address of said residential network access device.

4. The method according to claim 1, wherein said communication network comprises an untrusted part and a trusted part, said untrusted part comprising said residential network access device, said communication network further comprising a network access node device for establishing a communicative connection between said one or more remote provisioning devices and a plurality of residential network access devices including said residential network access device, wherein said network access node device and said one or more remote provisioning devices are part of said trusted part of said communication network, the method further comprising:

receiving a device identifier of said residential network access device at said network access node device;

retrieving said line identifier by which said residential network access device connects to said network access node device; and transmitting said line identifier to at least one of said one or more remote provisioning devices.

5. The method according to claim 4, further comprising:

storing said device identifier to obtain a device identifier-line identifier pair, said device identifier-line identifier pair being available for said network access node device; and determining whether to grant or to deny access to said network service by evaluating a request for said network service based on said device identifier-line identifier pair.

6. The method according to claim 4, wherein said communication network comprises a network router, and wherein said method further comprises:
   storing said device identifier to obtain a device identifier-IP address pair, said device identifier-IP address pair being available for said network router; and
   determining whether to grant or to deny access to said network service by evaluating a request for said network service based on said device identifier-IP address pair.

7. The system according to claim 4, wherein the device identifier of said residential network access device is a MAC address.

8. The method according to claim 1, wherein the IP address assigning server comprises a DHCP server.

9. The method according to claim 1, further comprising transmitting one or more service credentials to said IP address of said residential network access device.

10. The method according to claim 9, further comprising receiving said one or more service credentials from said residential network access device at a provisioning device delivering said network service.

11. The method according to claim 10, further comprising:
   linking said one or more service credentials to a service profile of a user of said residential network access device.

12. The method according to claim 10, further comprising:
   granting access to said network service by evaluating a request for said network service on the basis of said credentials.

13. The method according to claim 1, wherein said network service is a voice over IP (VoIP) telephony service.

14. The method according to claim 1, wherein at least one of said one or more remote provisioning devices controls said residential network access device using the session initiation protocol (SIP).

15. The system according to claim 1, wherein at least one of said one or more remote provisioning devices is arranged to control said residential network access device using the session initiation protocol (SIP).

16. A system for service preparation of a residential network access device to receive a network service over a communications network, said system comprising one or more remote provisioning devices and a network access node device for establishing a communicative connection between said one or more remote provisioning devices and a plurality of residential network access devices including said residential network access device, said remote provisioning devices being arranged to:
   receive a line identifier from said network access node device indicating a physical line used by said residential network access device to connect to said communication network;
   transmit an IP address from said one or more remote provisioning devices to said residential network access device for which said line identifier has been received, said IP address being a source address for said residential network access device; and
   transmit software code portions to said IP address of said residential network access device, said software code portions being required for receiving said network service, wherein said communication network comprises a network router, and wherein said network router is arranged to:
   receive a device identifier of said residential network access device;
   store said device identifier to obtain a device identifier-IP address pair, wherein said device identifier-IP address pair is available for said network router; and
   determine whether to grant or deny access to said network service by evaluating a request for said network service based on said device identifier-IP address pair,
   and wherein said communication network is a fibre network.

17. The system according to claim 16, wherein said network access node device is arranged to retrieve a MAC address of said residential network access device.

18. The system according to claim 16, wherein said communication network includes a router, and wherein said communication network is an Ethernet network between said residential network access device and said router and an IP network between said router and said one or more remote provisioning devices.

19. The system according to claim 18, wherein said network access node device is part of said Ethernet network, and wherein communication between said residential network access device and said network access node device and communication between said network access node device and said router is established over virtual local area networks (LANs).

20. The system according to claim 16, wherein said network access node device is arranged to:
   receive a device identifier of said residential network access device at said network access node device;
   retrieve said line identifier by which said residential network access device connects to said network access node device; and
   transmit said line identifier to at least one of said one or more remote provisioning devices.

21. The system according to claim 20, wherein said network access node device is further arranged to:
   store said device identifier to obtain a device identifier-line identifier pair, wherein said device identifier-line identifier pair is available for said network access node device; and
   determine whether to grant or deny access to said network service by evaluating a request for said network service based on said device identifier-line identifier pair.

22. The system according to claim 20, wherein the device identifier of said residential network access device is a MAC address.

23. The system according to claim 16, wherein said network service is a voice over IP (VoIP) telephony service.

24. A non-transitory computer-readable medium having stored thereon computer-executable instructions that, if executed by one or more remote provisioning devices cause the one or more remote provisioning devices to perform a method of service preparation of a residential network access device from the one or more remote provisioning devices to prepare said residential network access device to receive a network service over a communications network, said method comprising:
   receiving a line identifier indicating a physical line used by said residential network access device to connect to said communication network;
   transmitting an IP address from said one or more remote provisioning devices to said residential network access device for which said line identifier has been received, said IP address being a source address for said residential network access device; and transmitting software code portions to said IP address of said residential network access device, said software code portions being required for receiving said network service, wherein said one or more remote provisioning devices include an IP address assigning server for transmitting said IP address to said residential network access device, and a management server for transmitting said software code portions to said IP address, the method further comprising exchanging said IP address between said IP address assigning server and said management server, and wherein said communication network is a fibre network.

* * * * *